United States Patent
Balasubramanian et al.

(10) Patent No.: US 12,530,413 B2
(45) Date of Patent: Jan. 20, 2026

(54) SUGGESTING KEYWORDS TO DEFINE AN AUDIENCE FOR A RECOMMENDATION ABOUT A CONTENT ITEM

(71) Applicant: Maplebear Inc., San Francisco, CA (US)

(72) Inventors: Ramasubramanian Balasubramanian, San Francisco, CA (US); Taesik Na, Issaquah, WA (US); Karuna Ahuja, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/899,441

(22) Filed: Aug. 30, 2022

(65) Prior Publication Data

US 2024/0070210 A1 Feb. 29, 2024

(51) Int. Cl.
*G06F 16/9532* (2019.01)
*G06Q 30/0601* (2023.01)

(52) U.S. Cl.
CPC ..... *G06F 16/9532* (2019.01); *G06Q 30/0631* (2013.01)

(58) Field of Classification Search
CPC .............. G06F 16/9532; G06Q 30/0631
See application file for complete search history.

(56) References Cited

U.S. PATENT DOCUMENTS 8,626,742 B2 * 1/2014 Xu .......................... G06F 16/24
707/736
10,122,808 B2 * 11/2018 Vickrey ............ G06F 16/24578
(Continued)

FOREIGN PATENT DOCUMENTS

CA 3063243 A1 * 5/2021 ............. G06F 16/35
CN 101650731 A * 2/2010
(Continued)

OTHER PUBLICATIONS

Grbovic et al., 2016. Scalable Semantic Matching of Queries to Ads in Sponsored Search Advertising. In Proceedings of the 39th International ACM SIGIR conference on Research and Development in Information Retrieval (SIGIR '16). Association for Computing Machinery, New York, NY, USA, 375-384. (Year: 2016).*
(Continued)

*Primary Examiner* — Neveen Abel Jalil
*Assistant Examiner* — Hubert Cheung
(74) *Attorney, Agent, or Firm* — Fenwick & West LLP

(57) ABSTRACT

A computer-implemented method for suggesting keywords as a search term of a content item includes receiving, from a content provider, information about the content item in a database of content items. The method further includes generating a set of seed keywords related to the content item, and expanding the set of seed keywords to a plurality of candidate keywords. The plurality of candidate keywords are then scored based, at least in part, on an engagement metric measuring a user engagement with the content item in response to being presented with results from a search query comprising the candidate keyword. A candidate keyword is then selected from the plurality of candidate keywords based on the scoring, and stored relationally to the content item to define an audience for a recommendation about the content item, providing a suggestion to the content provider.

20 Claims, 9 Drawing Sheets

(56) References Cited

U.S. PATENT DOCUMENTS

| | | | |
|---|---|---|---|
| 10,242,090 B1* | 3/2019 | Kosloski | G06F 16/93 |
| 10,325,304 B2* | 6/2019 | Konik | G06F 16/3325 |
| 10,387,568 B1* | 8/2019 | Cheng | G06F 40/20 |
| 11,921,768 B1* | 3/2024 | Ganesh | G06N 3/02 |
| 2002/0133726 A1* | 9/2002 | Kawamae | G06F 16/9535 |
| | | | 713/300 |
| 2002/0138481 A1* | 9/2002 | Aggarwal | G06Q 30/02 |
| 2004/0019588 A1 | 1/2004 | Doganata et al. | |
| 2007/0143176 A1 | 6/2007 | Nong et al. | |
| 2007/0239671 A1* | 10/2007 | Whitman | G06F 16/951 |
| | | | 707/999.005 |
| 2009/0112848 A1* | 4/2009 | Kunjithapatham | G06F 16/7844 |
| | | | 707/999.005 |
| 2009/0204609 A1* | 8/2009 | Labrou | G06F 16/3322 |
| | | | 707/999.005 |
| 2009/0248676 A1* | 10/2009 | Sasaki | G06F 16/951 |
| | | | 707/999.005 |
| 2011/0264682 A1* | 10/2011 | Song | H04N 21/466 |
| | | | 707/769 |
| 2012/0158703 A1* | 6/2012 | Li | G06F 16/374 |
| | | | 707/723 |
| 2014/0019240 A1* | 1/2014 | Zhou | G06Q 30/0255 |
| | | | 705/14.66 |
| 2014/0330813 A1* | 11/2014 | Lee | G06F 16/248 |
| | | | 707/722 |
| 2015/0254714 A1* | 9/2015 | Zhuang | G06F 16/951 |
| | | | 705/14.54 |
| 2015/0339756 A1* | 11/2015 | Konik | G06F 16/3325 |
| | | | 705/26.7 |
| 2016/0266738 A1* | 9/2016 | Martello | G06F 8/34 |
| 2017/0295249 A1* | 10/2017 | Vickrey | H04L 65/403 |
| 2018/0113933 A1* | 4/2018 | Lewis | G06F 16/3344 |
| 2020/0410537 A1* | 12/2020 | Wang | G06F 16/90344 |
| 2022/0172247 A1* | 6/2022 | Rosen | G06F 16/35 |
| 2023/0005038 A1* | 1/2023 | Key | G06Q 30/0625 |
| 2023/0005042 A1* | 1/2023 | Key | G06Q 30/0639 |
| 2023/0118171 A1* | 4/2023 | Agarwal | G06F 16/35 |
| | | | 704/9 |
| 2023/0135683 A1* | 5/2023 | Balasubramanian | G06Q 30/0241 |
| | | | 705/26.7 |
| 2023/0252032 A1* | 8/2023 | Na | G06N 5/022 |
| | | | 707/769 |
| 2023/0252554 A1* | 8/2023 | Na | G06Q 30/0635 |
| | | | 705/26.81 |
| 2023/0315781 A1* | 10/2023 | Huang | G06F 16/535 |
| | | | 707/734 |

FOREIGN PATENT DOCUMENTS

| | | | | | |
|---|---|---|---|---|---|
| CN | 102207962 A | * | 10/2011 | | |
| CN | 104636403 A | * | 5/2015 | ......... | G06F 16/9535 |
| CN | 107562774 A | * | 1/2018 | | |
| CN | 110162770 A | * | 8/2019 | ......... | G06F 17/2775 |
| CN | 113705191 A | * | 11/2021 | | |
| CN | 115114994 A | * | 9/2022 | ........... | G06F 40/284 |
| CN | 115516448 A | * | 12/2022 | ....... | G06F 16/24578 |
| WO | WO-2007070199 A1 | * | 6/2007 | ............ | G06F 16/951 |
| WO | WO-2015135110 A1 | * | 9/2015 | ......... | G06Q 30/0256 |
| WO | WO-2016101812 A1 | * | 6/2016 | ....... | G06F 16/24578 |
| WO | WO-2022260872 A1 | * | 12/2022 | ....... | H04N 21/25891 |

OTHER PUBLICATIONS

Belem, F.M. et al. "Fixing the curse of the bad product descriptions—Search-boosted tag recommendation for E-commerce products," Information Processing & Management, vol. 57, No. 5, Sep. 2020, 19 pages.

Park, D. et al. "ConceptVector: Text Visual Analytics via Interactive Lexicon Building Using Word Embedding," *IEEE Transactions on Visualization and Computer Graphics*, vol. 24, No. 1, Aug. 31, 2017, pp. 361-370.

PCT International Search Report and Written Opinion, PCT Application No. PCT/US2023/027232, Oct. 11, 2023, 7 pages.

Shanahan, J. et al. "Digital advertising: An Information Scientist's Perspective," *Advanced Topics in Information Retrieval*, 2011, 30 pages.

\* cited by examiner

SUGGESTING KEYWORDS TO DEFINE AN AUDIENCE FOR A RECOMMENDATION ABOUT A CONTENT ITEM

BACKGROUND

A search engine is a software system designed to carry out searches. Generic online search engines search the World Wide Web in a systematic way for particular information specified in a search query. Content provider sites or e-commerce sites also include search engines, which help users to find relevant content items and/or products. Generally, content providers need to select a set of keywords for each of their content items, and these keywords are indexed in a search engine, such that when a user enters the keyword on a search engine, the content item corresponding to the keyword can be found by the search engine and presented to the user.

In search, it may be helpful to select a set of keywords that are relevant to the content items, such that the content items can be properly found and presented to the users who are searching for the content items. Content providers often have a good instinct about what keywords are relevant to their content items, although when the keywords are too few or specific, the content provider will miss the opportunity to have their content items to be presented to users; on the other hand, when the keywords are too many or too broad, the users may be overwhelmed with voluminous irrelevant results.

Further, in content suggestion, users who are interested in content A may also be interested in content B. For example, there is a statistically significant correlation between interest in beer and interest in snack food. As such, for a site, it might be helpful to suggest beer-related content items a customer who is searching for snack foods. To allow beer-related content items to be suggested to a user who is searching for snack food, keywords for beer-related content items need to include search terms related to snack food. But existing content providers might not be aware of such correlations, and/or might not have enough high-quality data covering all parts of the user journey (from seeing an content item to an action event) to provide guidance to content providers.

SUMMARY

This disclosure relates generally to suggesting keywords for a recommendation about content items, and more specifically, to computing hardware and software for suggesting keywords to define an audience for a recommendation about content items based on a set of seed keywords and user engagement metrics.

A content suggesting engine is a software system designed to suggest content to viewers. Content provider sites or e-commerce sites often include content suggesting engines, which help users to find relevant content items or products. Generally, content providers need to select a set of keywords for each of their content items, and these keywords are indexed in a content suggesting engine, such that when a user enters the keyword on a content suggesting engine, the content item corresponding to the keyword can be found by the content suggesting engine and presented to the user. It is critical to select a set of keywords that are relevant to the content items, such that the content items can be properly found and presented to the users based on their search queries. However, different users may search different terms when trying to find a same content item. It is difficult to predict what search term a user may input when they try to find a particular content item. Further, a user who searches for a first product (e.g., snacks) may also be interested in a second product (e.g., beer). It is even more difficult to predict such types of correlations. As such, there is a problem for content providers to select a proper set of keywords that define an audience for a recommendation about each content item, such that their content items are presented to interested users or viewers.

The principles described herein solve the above-described problem by generating a set of seed keywords associated with an item, using machine learning to generate a set of candidate keywords based on the set of seed keywords, selecting a keyword (or a set of keywords) from the candidate keywords based on engagement metric measuring a user engagement associated with the content item and the keyword, and storing the selected candidate keyword relationally to the content item to define an audience for a recommendation about the content item, providing a suggestion to the content provider.

Embodiments described herein include a computer system configured to receive, from a content provider, information about an item in a database of content items. The computer system then generates a set of seed keywords related to the content item, and generates a plurality of candidate keywords based on the set of seed keywords. In particular, generating the plurality of candidate keywords includes converting the seed keywords to an embedding using a trained query embedding model, identifying one or more candidate embeddings from a database based on a proximity of each candidate embedding to the embedding for the seed keyword, and determining the candidate keyword associated with each candidate embedding.

The computer system then scores each of the plurality of candidate keywords based, at least in part, on an engagement metric measuring a user engagement with the content item in response to being presented with results from a search query comprising the candidate keyword. The computer system then selects a candidate keyword (or a set of candidate keywords) from the plurality of candidate keywords based on the scoring, and suggests, to the content provider, the selected candidate keyword to define an audience for a recommendation about the content item.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
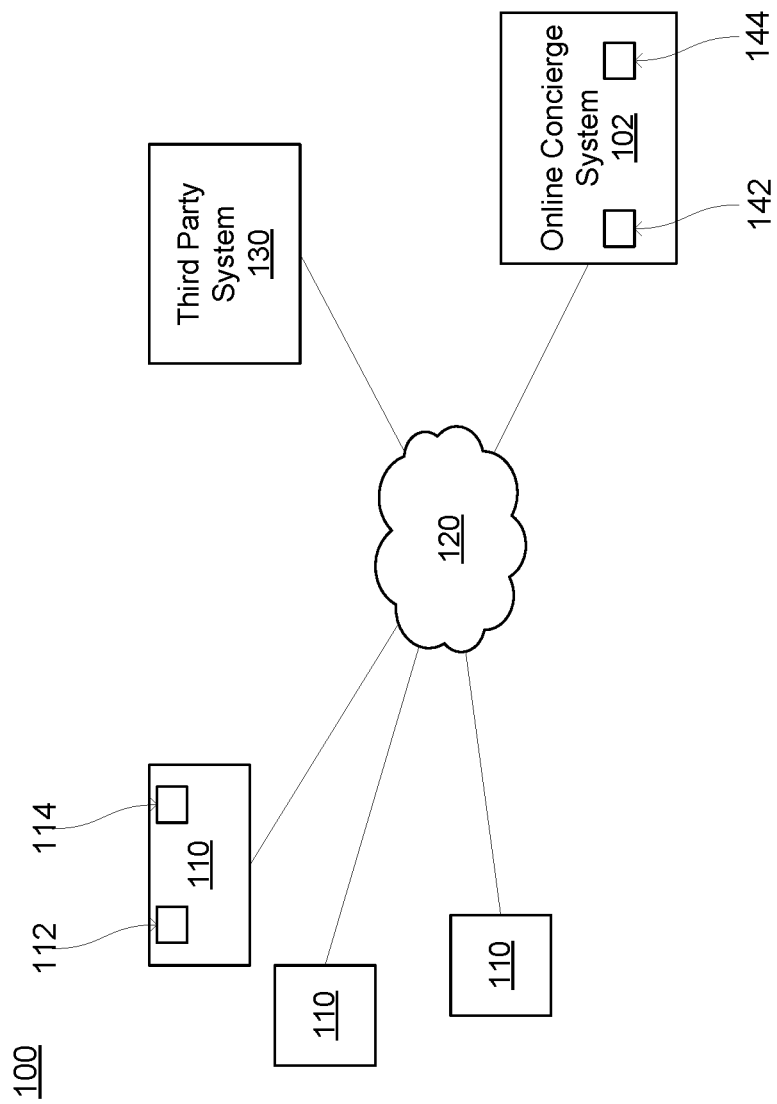
FIG. 1 is a block diagram of a system environment in which an online system operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a user mobile application 206 or a shopper mobile application 212 to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the user mobile application 206 or the shopper mobile application 212 to provide the functions.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one or more embodiments, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2-9. For example, the memory 144 has instructions encoded thereon that, when executed by the processor 142, cause the processor 142 to receive, from a content provider, information about an item in a database of content items, generate a set of seed keywords related to the item, expand the set of keywords to a plurality of candidate keywords, score each of the plurality of candidate keywords based, at least in part, on engagement metric measuring a user engagement, select a candidate keyword (or a set of candidate keywords) from the plurality of candidate keywords based on the scoring, and/or suggest the selected candidate keyword to define an audience for a recommendation about the content item. Additionally, the online concierge system 102 includes a communication interface configured to connect the online concierge system 102 to one or more networks, such as network 120, or to otherwise communicate with devices (e.g., client devices 110, and third party systems 130, such as content provider's systems) connected to the one or more networks.

One or more of client device 110, a third party system 130, or the online concierge system 102 may be special purpose computing devices configured to perform specific functions, as further described below in conjunction with FIGS. 2-9, and may include specific computing components such as processors, memories, communication interfaces, and/or the like.

System Overview

Figure 2:
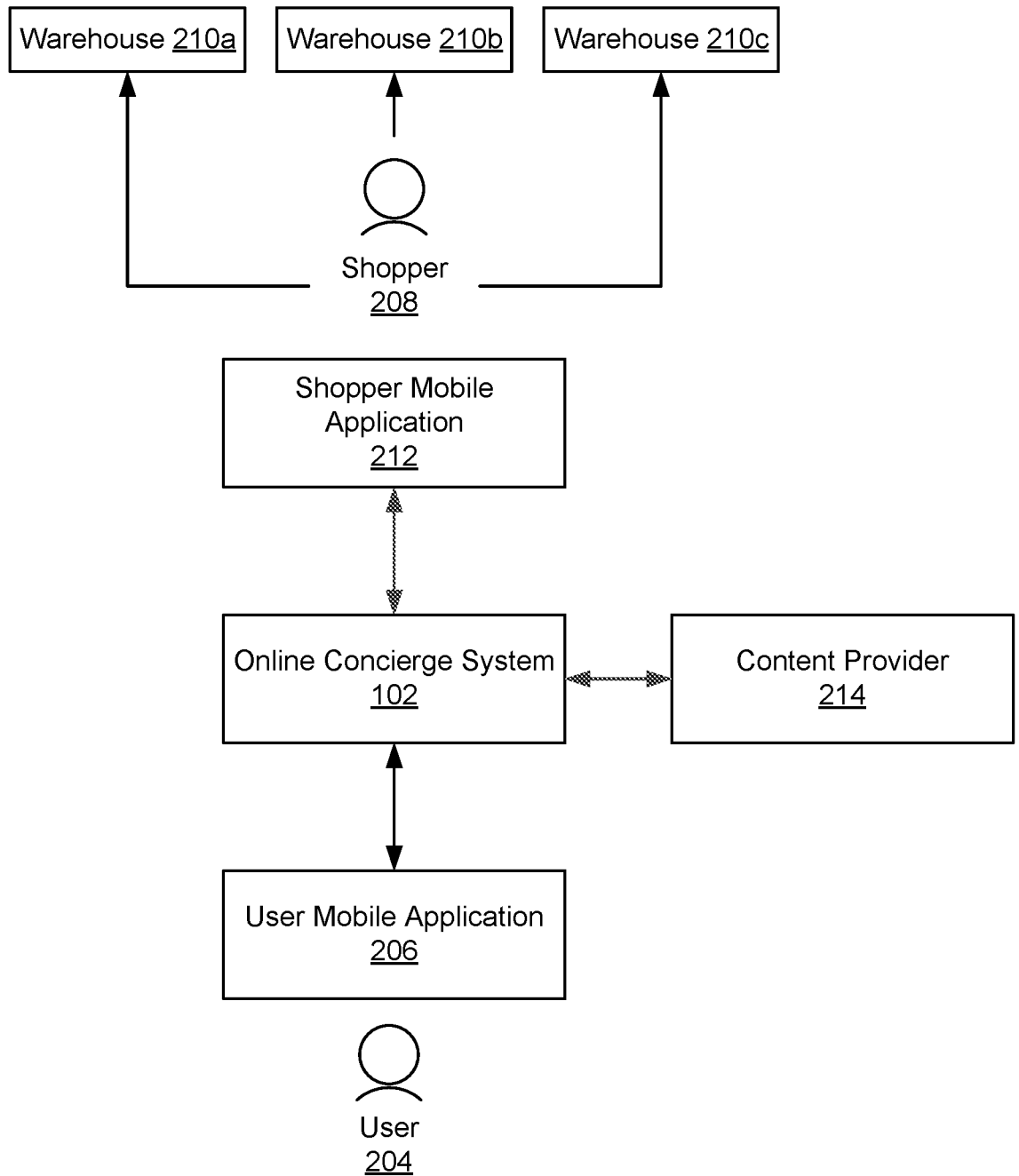
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a user mobile application (UMA) 206 to place the order; the UMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one or more embodiments, shoppers 208 make use of a shopper mobile application 212 which is configured to interact with the online concierge system 102.

The online concierge system 102 is also configured to obtain content items from one or more content providers 214. In some cases, the content providers 214 are associated with brands that provide content items associated with brands that are offered by the online concierge system 102. In some cases, the content providers 214 are associated with retailers that offer their products to users via the online concierge system 102. In some embodiments, the content items provided by the content providers 214 are associated with brands and/or products that are offered by the online concierge system 102. In some embodiments, the content items provided by the content providers 214 are associated with retailers that offer their products to users via the online concierge system 102. In some embodiments, the content providers are third-party entities that provide content items to users for other purposes.

Figure 3:
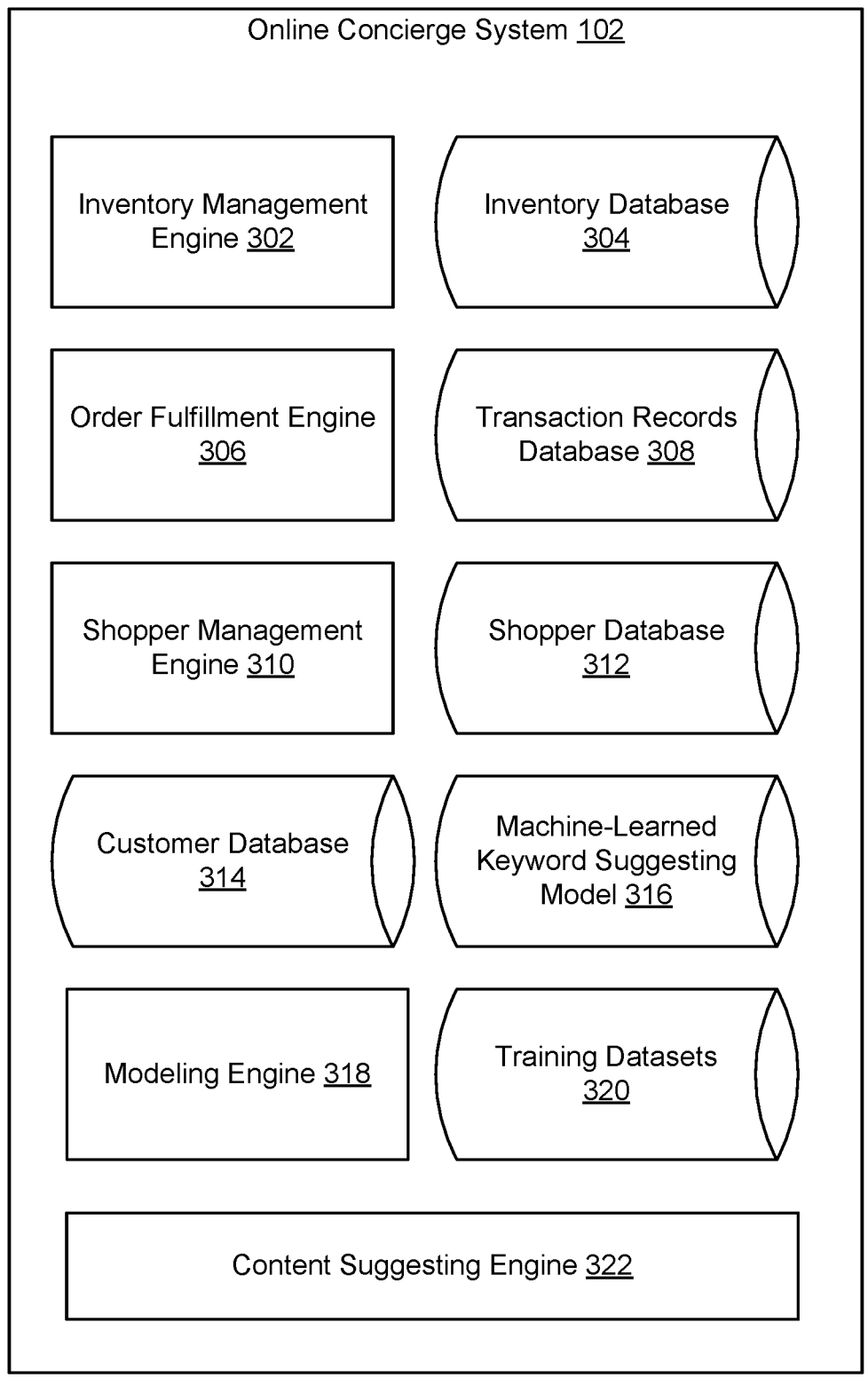
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the content item was last found, a time that the content item was last not found (a shopper looked for the content item but could not find it), the rate at which the content item is found, and the popularity of the content item.

For each item, the inventory database 304 identifies one or more attributes of the content item and corresponding values for each attribute of an item. For example, the inventory database 304 includes an entry for each item offered by a warehouse 210, with an entry for an item including an item identifier that uniquely identifies the content item. The entry includes different fields, with each field corresponding to an attribute of the content item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the content item catalog, the inventory management engine 302 determines a taxonomy of items offered by the warehouse 210, different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the content items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the content item, whereas the data within the training datasets 320 is structured to include an outcome of picking a delivery order (e.g., if the content item in an order was picked or not picked).

The online concierge system 102 also includes an order fulfillment engine 306 which is configured to synthesize and display an ordering interface to each user 204 (for example, via the user mobile application 206). The order fulfillment engine 306 is also configured to access the inventory database 304 in order to determine which products are available at which warehouse 210. The order fulfillment engine 306 may supplement the product availability information from the inventory database 304 with an item availability predicted by the machine-learned item availability model. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one or more embodiments, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the user mobile application 206. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the content items purchased, the total value of the content items, and in some cases, an identity of the shopper 208 and user 204 associated with the transaction. In one or more embodiments, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one or more embodiments, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine-Learning Based Keyword Suggesting Model

The online concierge system 102 further includes a machine-learning based keyword suggesting model 316, a modeling engine 318, and training datasets 320. The modeling engine 318 uses the training datasets 320 to generate the machine-learning based keyword suggesting model 316. The machine-learning based keyword suggesting model 316 can learn from the training datasets 320, rather than follow only explicitly programmed instructions.

In some embodiments, the online concierge system 102 further includes a content suggesting engine 322, configured to retrieve relevant content items provided by one or more content providers 214 based on a search query entered by a user at a client device 110, and suggest the relevant content items to the user or return the relevant content items as search results. Note, the relevant content items may include more than just content items directly related to a searched item. For example, a user may enter a first item in the search query. The content suggesting engine 322 may be configured to retrieve content items related to the first item, and/or additional content items related to second items that are often bought together (by this user or other users) with the first item. The content items related to the first item and second item may both be presented to the user, responsive to the search query searching for the first item. As another example, a user may enter a first brand in the search query. The content suggesting engine 322 may be configured to retrieve content items related to the first brand and/or additional content items related to other similar second brands. The content items related to the first brand and second brands may both be presented to the user, responsive to the search query searching for the first brand.

The one or more content providers 214 can associate keywords suggested by the machine-learning based keyword suggesting model 316 with their content items. In some embodiments, the content items may be associated with products and/or brands offered by the online concierge system 102, and/or retailers associated with the online concierge system 102. Further details about the modeling engine 318, the training datasets 320, and the machine-learning based keyword suggesting model 316 are described below with respect to FIGS. 4-8.

Figure 4:
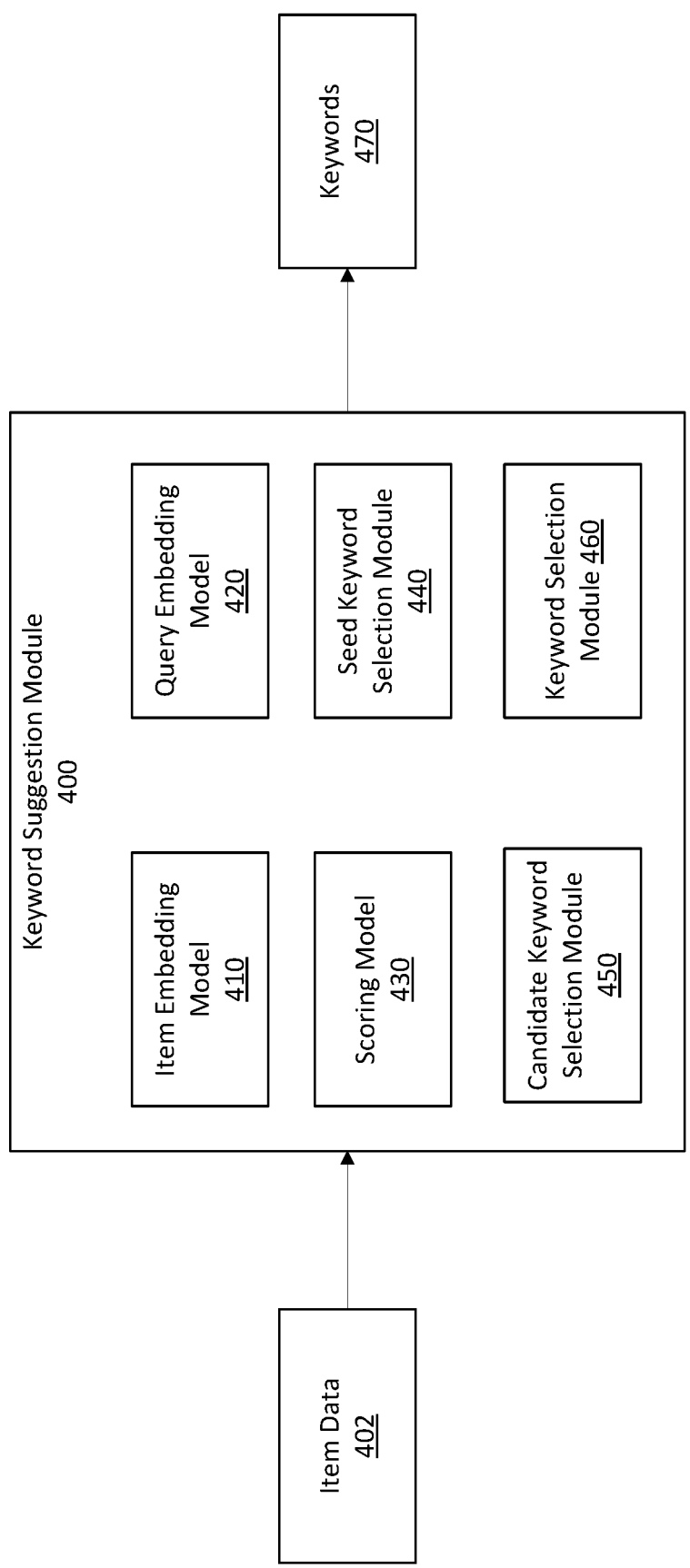
FIG. 4 is a block diagram for the keyword suggestion model, according to one or more embodiments.

FIG. 4 is a block diagram for the keyword suggestion model 400. The keyword suggestion model 400 is configured to receive item data 402 from a content provider. The item data 402 includes information about a content item in a database of content items. Responsive to receiving the item data 402, the keyword suggestion model 400 is configured to suggest one or more keywords 470 for the content item, where the suggested keywords define an audience for a recommendation about the content item. Assuming the one or more keywords 470 are accepted as keywords for the content item, when a user enters at least one of the keywords as a search term, the content item is presented to the user as a suggestion or a search result. In some embodiments, the keyword suggestion model 400 is configured to batch process all the content items in a database of content items. For each of the content items in the database of content items, the keyword suggestion model 400 is configured to suggest one or more keywords 470 for the content item, defining an audience for a recommendation about the content item.

In some embodiments, the keyword suggestion model 400 sends the suggested keywords 470 to the content provider for review. A user at the content provider may decide to accept or reject the suggested keywords. In response to accepting at least one suggested keyword, when the keyword is entered by a user as a search term in a search query, the content item is presented to the user as a suggestion or a search result.

In some embodiments, the keyword suggestion model 400 is configured to automatically accept the suggested keywords 470 for the content item without further review by users at the content provider. It is advantageous to automatically accept the suggested keywords as keywords, especially when the database of content items contains a large number of items, and a manual review of the suggested keywords for every item may become impractical. In some embodiments, after the suggested keywords 470 are accepted for the content items, additional search examples (in which after users enter these keywords as search terms, the user may or may not interact with the suggested content items) may become available. These examples may then be used by the keyword suggestion module 400 to modify the keywords or suggest different keywords for the content items.

The keyword suggestion model 400 includes a seed keyword selection model 440, an item embedding model 410, a query embedding model 420, a scoring model 430, a candidate keyword selection module 450, and a keyword selection module 460.

The seed keyword selection model 440 is configured to generate a set of seed keywords related to the content item. In some embodiments, the set of seed keywords may be generated based on user input at the content provider system. The user at the content provider system generally has the best understanding of what their content items are about and what they are trying to communicate to viewing users, and what aspect of an item they want to emphasize.

In some embodiments, the set of seed keywords may be generated by parsing a title or a description of a subject associated with the content item. The subject may be a product or a brand offered by the online concierge system 102, or a retailer associated with the online concierge system 102. The seed keyword selection model 440 is configured to select a few indicative words from the title or the description of the subject. There are multiple methods to identify indicative words. In some embodiments, term frequency-inverse document frequency (TF-IDF) for each word in the title or the description is computed. TF-IDF is a statistical measure that evaluates how relevant a word is to a title or a description of an item in a collection of titles or descriptions of items. In some embodiments, TF-IDF is computed by multiplying two metrics, namely how many times a word appears in the title or the description, and the inverse frequency of the word across a set of titles or descriptions of items.

In some embodiments, the content item embedding model 410 is configured to generate an item embedding for the content item in response to receiving the item data 402. The set of seed keywords may be inferred from similar or adjacent items or products in the content item embedding space based on K nearest neighbor or cosine similarity relative to the embedding of the content item. The title and/or description of these similar items may further be parsed to identify indicative words as keywords.

In some embodiments, the set of seed keywords may be generated based on previous queries for the content item with a highest metric that the content provider desires. The metric may be a conversion rate, a click-through rate, incremental sales, a long-term value, a number of impressions, etc. In some embodiments, the set of seed keywords may be inferred from similar items that are identified in the content item embedding space with a highest metric that the content provider desires. Similarly, such metric may be a conversion rate, a click-through rate, incremental sales, a long-term value, a number of impressions, etc.

In some embodiments, the set of seed keywords are generated based on similar queries in a same or similar latent space. For example, the content item embeddings may be correlated with embeddings of another space, such as query embeddings, user embeddings, product embeddings, and/or other embeddings. The set of seed keywords may be selected based on corresponding embeddings of the other space or comparison of the embeddings in the content item space and the query space.

Alternatively, or in addition, a combination of output of multiple methods (e.g., two or more of the above-described methods) is used to generate a set of seed keywords.

After a set of seed keywords are generated, the candidate keyword selection module 450 is configured to expand the set of seed keywords into a set of candidate keywords, defining an audience for a recommendation about the content item. In some embodiments, the candidate keyword selection module 450 is configured to access a query embedding space (which is a database) having embeddings corresponding to a plurality of search terms entered in queries. The candidate keyword selection module 450 also has access to a query embedding model 420 configured to convert a search term or a keyword into a query embedding. In particular, the candidate keyword selection module 450 inputs each seed keyword into the query embedding model 420, causing the query embedding model 420 to convert the seed keyword into a query embedding.

The candidate keyword selection module 450 can then identify one or more candidate embeddings from the query embedding space based on a proximity of each candidate embedding to the embedding for the seed keyword. For example, in some embodiments, the seed keyword selection model 440 is configured to select candidate keywords having query embeddings that are top K nearest to the query embedding of the seed keywords, or that are within a predetermined distance from the embeddings of the seed keywords.

Once a set of candidate keywords are generated, the scoring model 430 may then score each of the candidate keywords based on various metrics and rank them based on their corresponding scores. In some embodiments, the scoring model 430 is configured to score each of the plurality of candidate keywords based on an engagement metric measuring a user engagement with the content item in response to being presented with results from a search query comprising the candidate keyword. Once the set of candidate keywords are scored, the keyword selection module 460 can then rank the candidate keywords based on their scores and select one or more keywords 470 among the candidate keywords that have the best scores. In some embodiments, a top predetermined number of candidate keywords are selected to be suggested to the content provider. Alternatively or in addition, candidate keywords having a score greater than a predetermined threshold are selected to be suggested to the content provider.

Figure 5:
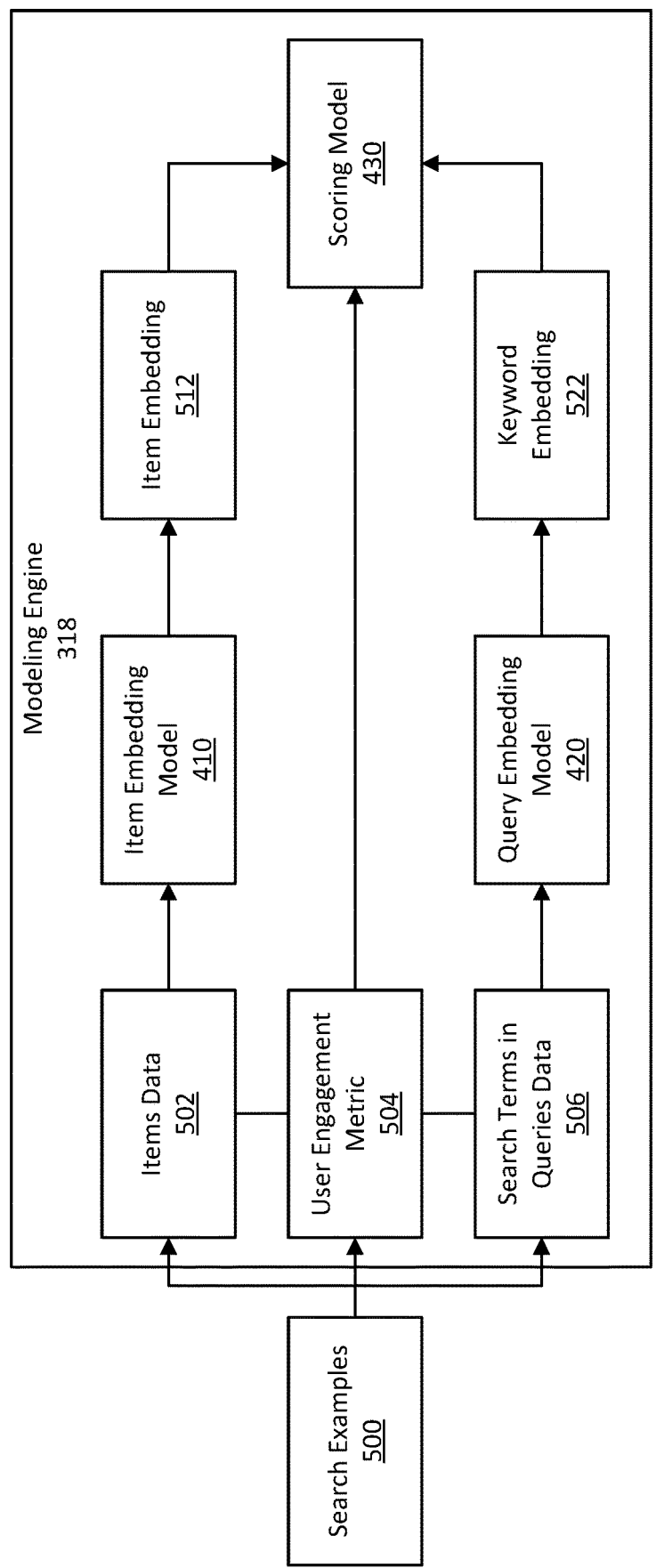
FIG. 5 is a block diagram for the modeling engine configured to train the content item embedding model, the query embedding model, and/or the scoring model, according to one or more embodiments.

FIG. 5 is a block diagram for the modeling engine 318 configured to train the content item embedding model 410, the query embedding model 420, and/or the scoring model 430 in accordance with some embodiments. Alternative embodiments may include more, fewer, or different components from those illustrated in FIG. 5, and the functionality of each component may be divided between the components that differ from the description below. Additionally, each component may perform its respective functionalities in response to a request from a human, or automatically without human intervention.

In some embodiments, the modeling engine 318 receives a plurality of search examples 500 related to instances where users submitted search queries to the online concierge system 102. For each search query, the user was presented with a set of items in response to the search query. Each search example 500 includes item data 502 associated with the set of items presented to the user, and search terms in queries data 506. User engagement metric 504 may be at different levels, such as item level, query level, and/or <query, item> pair level. When the user engagement metric is at an item level, for each item in the set of items presented to the user, there is a user engagement metric 504 associated therewith. When the user engagement metric is at query level, for each query user entered, there is a user engagement metric 504 associated therewith. When the user engagement metric is at <query, item> pair level, for each <query, item> pair, there is a user engagement metric 504 associated therewith. The user engagement metric 504 may include a click-through rate, incremental sales, a long-term value, a number of impressions, and/or any other metric that is desired by the content provider.

The content item embedding model 410 is trained to generate an item embedding 512 for each item returned from a search query. The query embedding model 420 is trained to generate a query embedding 522 for each keyword in a search query. The scoring module 430 is configured to score the keyword and item pair, indicating a user engagement metric when the content item is presented to the user in response to searching the keyword. For example, in some embodiments, the user engagement metric indicates a likelihood of a user that clicks the content item in response to searching the keyword. In some embodiments, a higher score of the user engagement metric indicates that when a user searches the keyword, the user is probably interested in the content item, because the likelihood of the user clicking the content item is very high; on the other hand, a lower score indicates that when a user searches the keyword, the user is probably not interested in the content item, because the likelihood of the user clicking the content item is very low.

In some embodiments, the content items are associated with products offered by the online concierge system 102. In some embodiments, products data associated with products offered by the online concierge system 102 may also be converted into product embeddings in a product embedding space. In some embodiments, a content item and a product have a one-on-one mapping relationship. In such a case, the items data and products data may be stored as a single set of data, or be one-on-one mapped to each other; the content item embedding space and the product embedding space may be a same space or a parallel space. In some embodiments, a content item and a product do not have a one-on-one mapping relationship. For example, a content item may correspond to multiple products, or a product may correspond to multiple content items. In such a case, items data and products data do not have a one-on-one mapping relationship, and the content item embedding space and the product embedding space may be two different spaces. In some embodiments, the modeling engine 318 also includes a product embedding model (not shown) configured to convert products data (associated with the products offered by the online concierge system 102) into a product embedding, and the products data may also be considered by the modeling engine to train the scoring model 430.

In some embodiments, each of the search example 500 also includes user data associated with a particular user who submitted the search query. In some embodiments, modeling engine 318 also includes a user embedding model (not shown) configured to generate a user embedding model for each user that enters a search query. The user embedding can also be used to modify the scoring model 430 to be customized to different types of users based on the user data.

Once the scoring model 430 is trained, the scoring model 430 is configured to generate a score based on (1) a keyword (corresponding to a query embedding) and a content item (corresponding to an item embedding) pair, (2) a product (corresponding to a product embedding), and/or (3) user data (corresponding to a user embedding) of a user, indicating when a keyword is in a search query, a likelihood of the user clicking the content item and/or purchase the product if the content item is presented to the user responsive to the search query.

Figure 6:
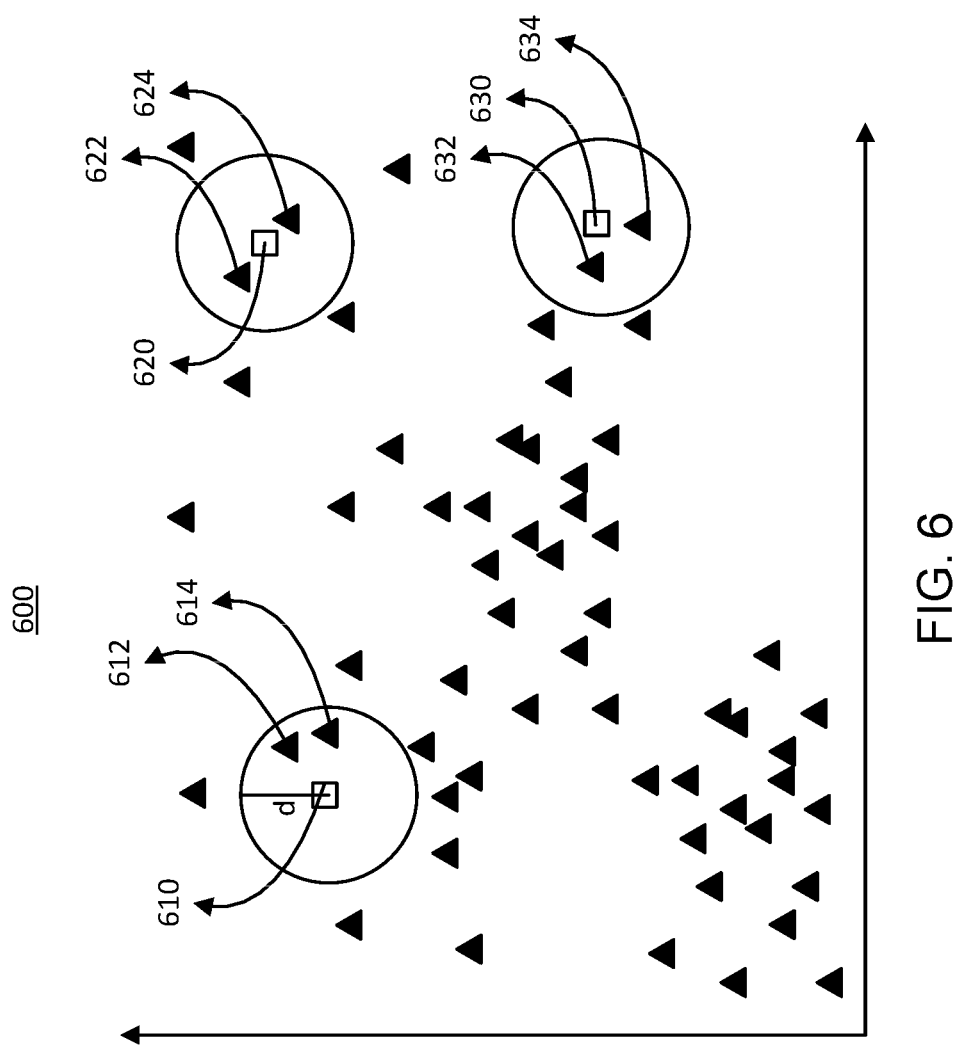
FIG. 6 is a chart illustrating a query embedding space having two dimensions, according to one or more embodiments.

FIG. 6 is a chart illustrating an example query embedding space 600 having two dimensions. Note, in reality, the query embedding space is likely to be more than two dimensions. Here, the two-dimensional query embedding space 600 in FIG. 6 is for illustration purposes only due to the difficulties of visualizing high-dimensional data.

In FIG. 6, square markings 610, 620, and 630 represent embeddings of a set of seed keywords, and triangle markings represent embeddings of other keywords in the space 600. In some embodiments, for each seed keyword, the candidate keyword selection module selects K keyword embeddings in the space 600 that are the nearest to the embeddings of the seed keyword. In some embodiments, the candidate keyword selection module 450 selects candidate keywords in the space 600 that are within a predetermined distance d to the embeddings 610, 620, 630 of the seed keywords.

For example, embeddings 612, 614 are within the distance d to the embedding 610, or are the two nearest embeddings to the embedding 610; embeddings 622, 624 are within the distance d to the embedding 620, or the two nearest embeddings to the embedding 620; and embeddings 632, 634 are within the distance d to the embedding 630, or the two nearest embeddings to the embedding 630. Once the embeddings 612, 614, 622, 624, 632, 634 are identified, the keywords corresponding to these embeddings can be identified. These keywords, along with the keywords in the seed set, are the candidate keywords, defining an audience for a recommendation about the content item. The scoring model 430 can take each of the query embeddings of the candidate keyword and the content item embedding of the content item as input to generate a score, indicating an engagement metric measuring a user engagement with the content item in response to being presented with results from a search query comprising the candidate keyword.

Alternatively, or in addition, the candidate keywords may be generated based on similar items identified in an item embedding space. Similar to the query embedding space, the item embedding space is also a multi-dimensional space. Embeddings of candidate items that are the nearest K or within a predetermined distance to the embeddings of the target item may also be identified, and the set of candidate keywords may be generated based on the candidate items.

Figure 7:
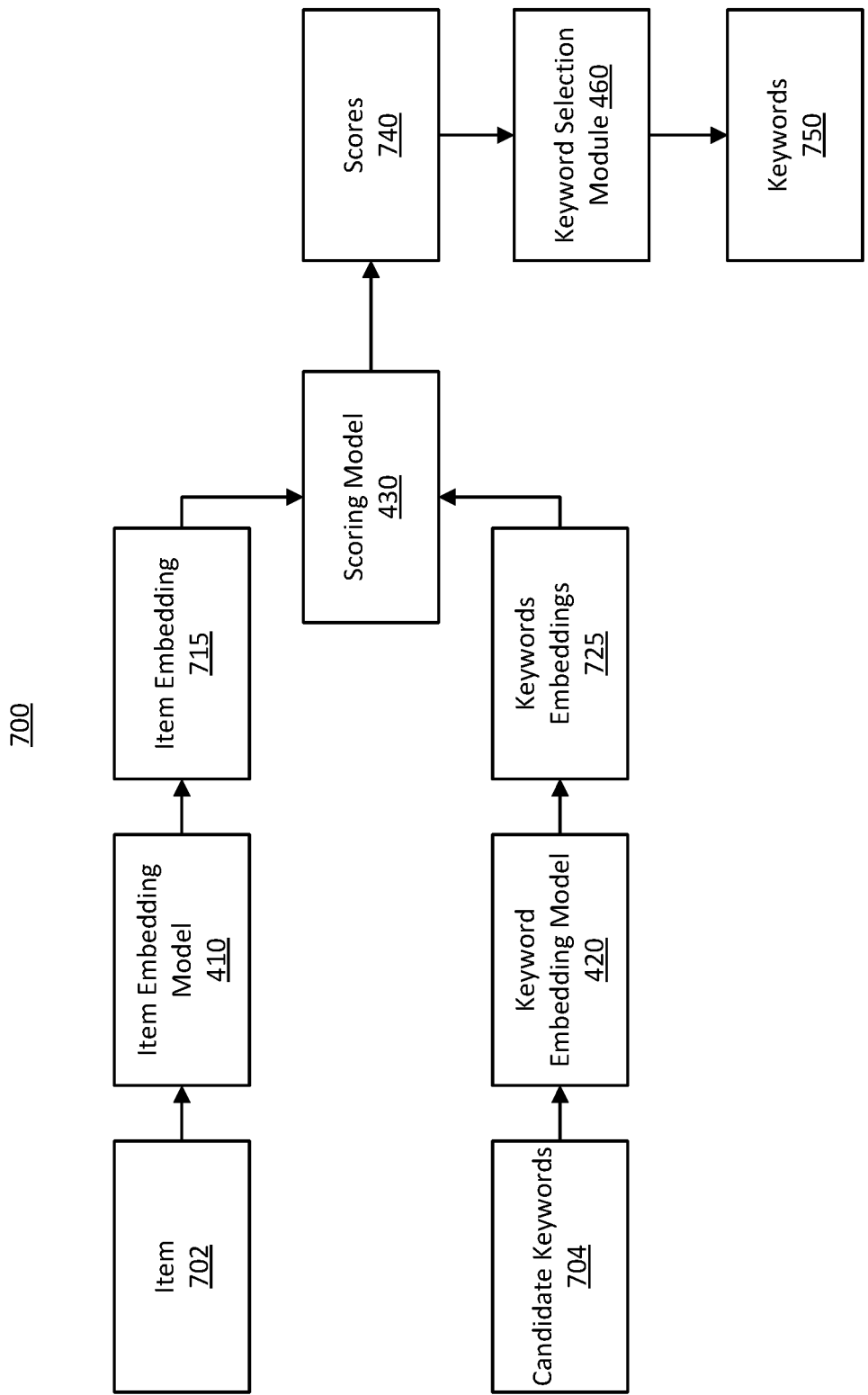
FIG. 7 illustrates a block diagram of a process for generating a score for each candidate keyword, according to one or more embodiments.

Once the candidate keywords are generated, the scoring module 430 can then generate a score for each candidate keyword, indicating a metric measuring a user engagement with the content item in response to being presented with results from a search query comprising the candidate keyword. FIG. 7 illustrates a block diagram 700 of a process for generating a score for each candidate keyword, according to an embodiment. Alternative embodiments may include more, fewer, or different components from those illustrated in FIG. 7, and the functionality of each component may be divided between the components that differ from the description below. Additionally, each component may perform its respective functionalities in response to a request from a human, or automatically without human intervention Item 702 is a content item in a database of content items received from a content provider. The content item 702 is input to the content item embedding model 410 to be converted to an item embedding 715. Each candidate keyword 704 is input to the query embedding model 420 to be converted to a query embedding 725. The content item embedding 715 and the query embedding 725 are input to the scoring model 430 to generate a score 740, indicating an engagement metric measuring a user engagement with the content item in response to being presented with results from a search query comprising the candidate keyword 704. Multiple candidate keywords 704 would result in multiple scores 740. The multiple scores 740 are then input to the keyword selection module 460 to select one or more keywords 750 from the candidate keywords. For example, the keyword selection module 460 may select top K (where K is a predetermined number) keywords that have the best scores, or select keywords that have scores higher than a predetermined threshold. The one or more selected keywords 750 are then suggested to the content provider as keywords for the content item 702.

In some embodiments, a user at the content provider may decide to accept or reject the suggested keywords 750 for each item. In response to accepting at least one suggested keyword, the suggested keyword is set as a keyword for the content item, that is, when the keyword is entered in a search query, the content item is presented to the user as a suggestion or a search result.

In some embodiments, the keyword selection module 460 is configured to automatically accept the suggested keywords as keywords for the content item without further review by users at the content provider. As such, when any one of the suggested keywords is entered in a search query, the content item is returned as at least one of the suggestions and/or search results. It is advantageous to automatically accept the suggested keywords as keywords for content items, especially when the database of content items contains a large number of items, and a manual review of the suggested search terms for every item may become impractical.

In some embodiments, after the suggested keywords 750 are accepted as keywords for the content items, additional search examples may become available. Each of these additional search examples includes a query containing at least one suggested keyword, and a content item returned as a suggestion or a search result. The online concierge system 102 can compute or obtain an engagement metric measuring a user engagement with the content item in response to being presented as the suggestion or the search result from the search query comprising the keyword. These examples may then be used as additional training data to retrain or further train the item embedding model 410, the query embedding model 420, and/or the scoring model 430. The retrained models 410, 420, and/or 430 can then be applied to items 702 to suggest different keywords for items 702. Since the different keywords are generated based on new training data, including engagement metric measuring user engagement with the content item in response to search terms including the previously suggested keywords, the different keywords would result in better engagement metric and provide better user experience.

Figure 8:
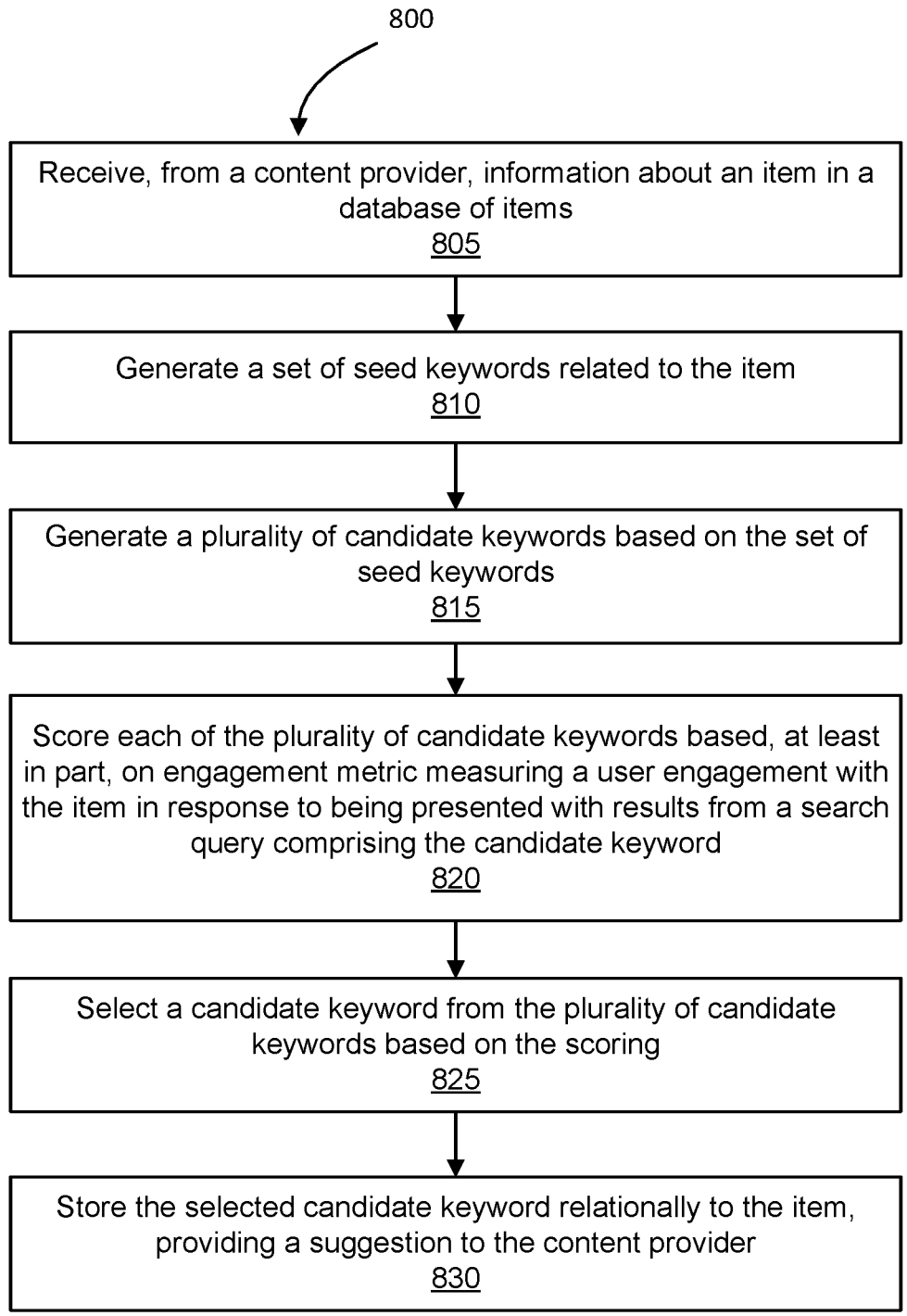
FIG. 8 is a flowchart of a method for suggesting keywords to a content provider as a search term for an item, according to one or more embodiments.

FIG. 8 is a flowchart of a method 800 for suggesting keywords to a content provider as a search term for an item according to one or more embodiments. In various embodiments, the method includes different or additional steps than those described in conjunction with FIG. 8. Further, in some embodiments, the steps of the method may be performed in different orders than the order described in conjunction with FIG. 8. The method described in conjunction with FIG. 8 may be carried out by the online concierge system 102 in various embodiments, while in other embodiments, the steps of the method are performed by any online system capable of retrieving content items.

The online concierge system 102 receives 805, from a content provider, information about a content item in a database of content items. In some embodiments, the content item is associated with a product or a brand offered by the online concierge system 102. In some embodiments, the content item is associated with a retailer that offers products to users via the online concierge system 102. In some embodiments, the online concierge system 102 is configured to batch process multiple items in the database or multiple items in multiple databases.

The online concierge system 102 then generates 810 a set of seed keywords related to the content item. In some embodiments, the set of seed keywords may be received from the content provider system. In some embodiments, the set of seed keywords may be entered by a user at the content provider system. The user at the content provider system generally has the best understanding of what their content items are about and what they are trying to communicate to viewing users, and what aspect of an item they want to emphasize.

Alternatively, the set of seed keywords may be generated automatically by the online concierge system 102. In some embodiments, the set of seed keywords may be generated by parsing a title or a description of a subject associated with the content item. The subject may be a product or a brand offered by the online concierge system 102, or a retailer associated with the online concierge system 102. The online concierge system 102 is configured to select a few indicative words from the title or the description of the subject and use the indicative words as seed keywords. There are multiple methods to identify indicative words. In some embodiments, term frequency-inverse document frequency (TF-IDF) for each word in the title or the description is computed. TF-IDF is a statistical measure that evaluates how relevant a word is to a title or a description of an item in a collection of titles or descriptions of items. In some embodiments, TF-IDF is computed by multiplying two metrics, namely, how many times a word appears in the title or the description, and the inverse frequency of the word across a set of titles or descriptions of items.

In some embodiments, the online concierge system 102 is configured to generate an item embedding for the content item in response to receiving the content item data. The set of seed keywords may be inferred from similar items or products in the content item embedding space based on K nearest neighbors or cosine similarity relative to the embedding of the content item. The title and/or description of these similar items may be parsed to identify indicative words as seed keywords.

In some embodiments, the set of seed keywords may be generated based on previous queries for the content item with a highest metric that the content provider desires. The metric may be a conversion rate, a click-through rate, incremental sales, a long-term value, a number of impressions, etc. In some embodiments, the set of seed keywords may be inferred from similar items that are identified in the content item embedding space with a highest metric that the content provider desires. Similarly, such metrics may be a conversion rate, a click-through rate, incremental sales, a long-term value, a number of impressions, etc.

In some embodiments, the set of seed keywords are generated based on similar queries in a same or similar latent space. For example, the content item embeddings may be correlated with embeddings of another space, such as query embeddings, user embeddings, product embeddings, and/or other embeddings. The set of seed keywords may be selected based on corresponding embeddings of the other space or comparison of the embeddings in the content item space and the query space.

Alternatively, or in addition, a combination of output of multiple methods (e.g., two or more of the above-described methods) is used to generate a set of seed keywords.

The online concierge system 102 then generates 815 a plurality of candidate keywords based on the set of seed keywords, where the candidate keywords define an audience for a recommendation about the content item. In some embodiments, the online concierge system 102 is configured to access a query embedding space (which is a database) having embeddings corresponding to a plurality of search terms entered in queries. The plurality of candidate keywords are selected based on embeddings of keywords that are similar or adjacent to the embeddings of the seed keywords in the query embedding space. Further details about selecting the plurality of candidate keywords are discussed below with respect to FIG. 9.

The online concierge system 102 then scores 820 each of the plurality of candidate keywords based, at least in part, on engagement metric measuring a user engagement with the content item in response to being presented with results from a search query comprising the candidate keyword. A scoring model (such as the scoring model 430) may be trained based on a training dataset including multiple query examples. Each query example includes a set of search terms entered in a query, a set of items returned as suggestions or search results, and a user engagement metric indicating a user's response to each item in the set of items displayed to the user responsive to the query. In some embodiments, the user engagement metric indicates a click-through rate, incremental sales, a long-term value, a number of impressions, and/or any other metric that is desired by the content provider. For example, a higher score of the user engagement metric indicates that when a user searches the keyword, the user is probably interested in the content item, because the likelihood of the user clicking the content item is very high; on the other hand, a lower score indicates that when a user searches the keyword, the user is probably not interested in the content item, because the likelihood of the user clicking the content item is very low.

The online concierge system 102 then selects 825 a candidate keyword (or a set of candidate keywords) from the plurality of candidate keywords based on the scoring. For example, the online concierge system 102 may select top K (where K is a predetermined number) keywords that have the best scores, or select keywords that have scores better than a predetermined threshold.

The online concierge system 102 then stores 830 the selected candidate keyword relationally to the content item to define an audience for a recommendation about the content item, providing a suggestion to the content provider. In some embodiments, a user at the content provider may decide to accept or reject the suggested keywords. In response to accepting at least one suggested keyword, the suggested keyword is set as a search term for the content item, that is, when the keyword is entered in a search query, the content item is returned as at least one of the suggestions or search results.

In some embodiments, the online concierge system 102 is configured to automatically accept suggested keywords for the content item without further review by users at the content provider. As such, when any one of the suggested keywords is entered in a search query, the content item is returned as at least one of the suggestions or search results. It is advantageous to automatically accept the suggested keywords as keywords, especially when the database of content items contains a large number of items, and a manual review of the suggested search terms for every item may become impractical. In some embodiments, after the suggested keywords are accepted as keywords for the content items, additional query examples may become available. These additional query examples may then be used as additional training data to retrain or further train the scoring model, which can then be used to modify the keywords.

Figure 9:
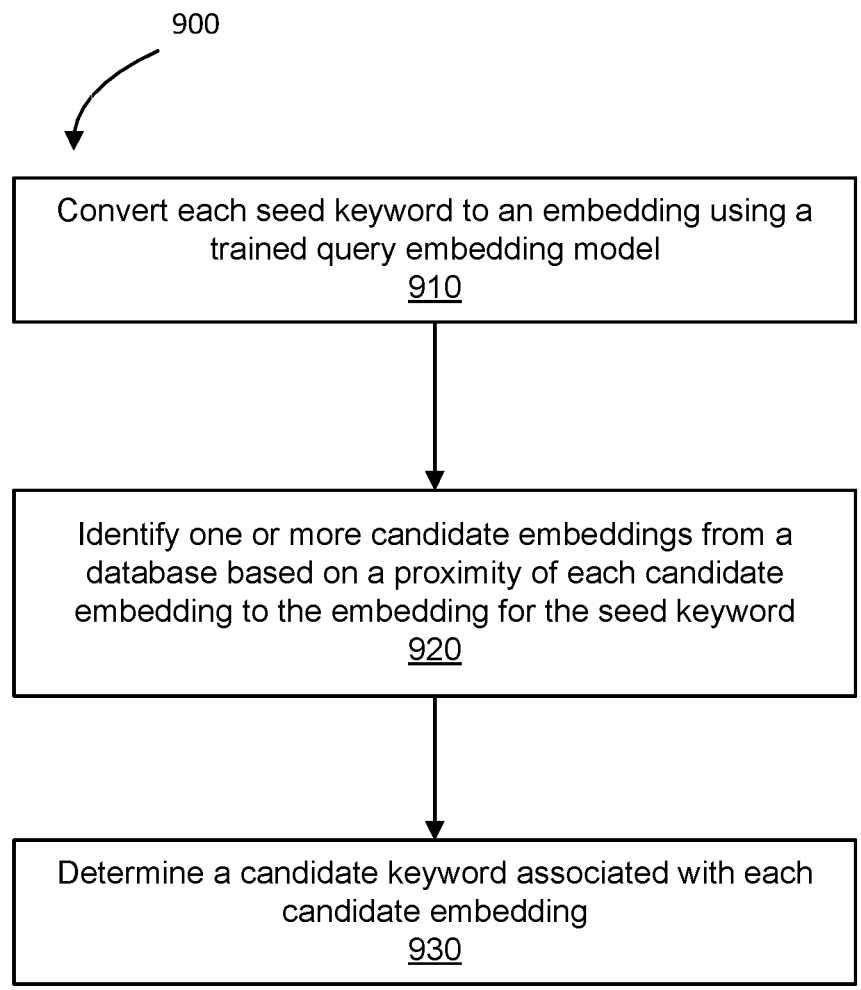
FIG. 9 is a flowchart of a method for generating a plurality of candidate keywords based on a set of seed keywords, according to one or more embodiments.

FIG. 9 is a flowchart of a method 900 for generating a plurality of candidate keywords based on a set of seed keywords according to one or more embodiments. The method 900 may correspond to act 815 of FIG. 8. In various embodiments, the method 900 includes different or additional steps than those described in conjunction with FIG. 9. Further, in some embodiments, the steps of the method may be performed in different orders than the order described in conjunction with FIG. 9.

The online concierge system 102 converts 910 each seed keyword to a query embedding using a trained query embedding model (e.g., the query embedding model 420). In some embodiments, the online concierge system 102 has access to a query embedding space (which is a database) mapping search terms to embeddings in the query embedding space. For each seed keyword, a query embedding can be identified in the query embedding space.

The online concierge system 102 then identifies 920 one or more candidate embeddings from the database on a proximity for each candidate embedding to the embedding for the seed keywords. In the query embedding space, each embedding corresponding to a seed keyword has one or more adjacent embeddings corresponding to additional search terms. These adjacent embeddings may be identified as candidate embeddings. The online concierge system 102 can then determine 930 a candidate keyword associated with each candidate embedding.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which could include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, at a computer system comprising at least one processor and memory:
 receiving, from a content provider, information about a content item in a database of content items;
 generating a set of seed keywords related to the content item;
 generating a plurality of candidate keywords based on the set of seed keywords by, comprising:
 for each of the set of seed keywords,
   converting the seed keyword to an embedding using a trained query embedding model, the trained query embedding model being a machine learning model trained on historical query-result pairs to learn an embedding space, in which keywords that, when submitted as search queries, result in similar search results that have embeddings that are close to each other, each embedding being a vector representation of a keyword in search queries in the embedding space;
   identifying one or more candidate embeddings from the embedding space based on computed proximity measures between each candidate embedding and the embedding for the seed keyword, wherein each proximity measure is determined using a distance function applied to each candidate embedding and the embedding of the seed keyword in the embedding space; and
   decoding the one or more candidate embeddings into one or more candidate keywords;
 scoring each of the plurality of candidate keywords based, at least in part, on an engagement metric measuring user engagement with the content item in response to being presented with results from a search query comprising the candidate keyword, wherein the results are returned by a search engine in response to the search query and are different from the content item;
selecting a candidate keyword from the plurality of candidate keywords that has a highest score;
providing a suggestion to the content provider that the selected candidate keyword be included as a search keyword for the content item;
storing the suggested selected candidate keyword in a structured index for retrieval in response to future search queries;
receiving a new search query from a user, the new search query including one or more keywords;
in response to determining that the new search query contains the suggested selected candidate keyword, identifying the content item associated with the suggested selected candidate keyword from the structured index;
retrieving the content item from the database of content items;
providing the retrieved content item with results of the new search query for display to the user;
measuring user engagement of the user with the retrieved content item in response to being presented with the results of the new search query; and
updating the score of the suggested selected candidate keyword based on the user engagement with the retrieved content item.

2. The method of claim 1, further comprising:
receiving a selection from the content provider to use the suggested selected candidate keyword to define an audience for a recommendation about the content item;
receiving a search query from a user of a client device, wherein the received search query includes the suggested selected candidate keyword;
responsive to receiving the search query that includes the suggested selected candidate keyword, including the recommendation about the content item in a set of recommendations or search results responsive to the received search query; and
sending the set of recommendations or the search results for display to the user.

3. The method of claim 1, whrein scoring each of the plurality of candidate keywords based, further in part, on a similarity of the candidate keyword to a seed keyword for the set of seed keywords.

4. The method of claim 1, wherein generating the set of seed keywords related to the content item comprises receiving an input from the content provider, indicating the set of seed keywords.

5. The method of claim 1, wherein generating the set of seed keywords related to the content item comprises parsing a title of the content item or a description of a subject associated with the content item to identify the set of see keywords.

6. The method of claim 5, wherein parsing the title of the content item or the description of the subject associated with the content item comprises:
for each word in the title of the content item or the description of the subject associated with the content item, computing a term frequency-inverse document frequency (TF-IDF); and
selecting the set of seed keywords based on the computed TF-IDFs thereof.

7. The method of claim 1, wherein generating the set of seed keywords related to the content item comprises:
accessing a database of an item embedding space;
converting the content item into an item embedding in the item embedding space;
identifying one or more candidate item embeddings that are similar or adjacent to the item embedding;
identifying one or more candidate content items corresponding to the one or more candidate item embeddings; and
selecting the set of seed keywords based on titles of the one or more candidate content items or descriptions of subjects associated with the one or more candidate content items.

8. The method of claim 1, wherein scoring each of the plurality of candidate keywords based, at least in part, on the engagement metric is performed by a machine learning scoring model, trained by a dataset comprising query examples, each of the query examples including (1) a search term entered in a search query, (2) a content item in a recommendation or a search result responsive to the search query, and (3) the engagement metric measuring a user engagement with the content item in response to being presented as the recommendation or the search result from the search query comprising the search term.

9. The method of claim 1, wherein the engagement metric measuring the user engagement includes at least one of a conversion rate, a click-through rate, incremental sales, a long-term value, or a number of impressions.

10. The method of claim 9, wherein scoring each of the plurality of candidate keywords based, at least in part, on the engagement metric is performed by a machine learning scoring model, trained by a dataset comprising query examples, each of the query examples including (1) a search term entered in a search query, (2) a content item in a search result responsive to the search query, and (3) the engagement metric measuring a user engagement with the content item in response to being presented with the search result from the search query comprising the search term.

11. The method of claim 10, further comprising:
receiving the search query containing the suggested selected candidate keyword;
returning the content item as a search result responsive to the search query;
obtaining the engagement metric measuring the user engagement with the content item in response to being presented with the search result from the search query comprising the suggested selected candidate keyword; and
adding a search example corresponding to the search query to the dataset to further train the machine learning scoring model.

12. A computer program product comprising a non-transitory computer readable storage medium having instructions encoded thereon that, when executed by a processor, cause the processor to:
receive, from a content provider, information about an item in a database of content items;
generate a set of seed keywords related to the content item;
generate a plurality of candidate keywords based on the set of seed keywords by, comprising:
for each of the set of seed keyword:
converting the seed keyword to an embedding using a trained query embedding model, the trained query embedding model being a machine learning model trained on historical query-result pairs to learn an embedding space, in which keywords that, when submitted as search queries, result in similar search results that have embeddings that are close to each other, each embedding being a vector representation of a keyword in search queries in the embedding space;

identifying one or more candidate embeddings from the embedding space based on computed proximity measures between each candidate embedding and the embedding for the seed keyword, wherein each proximity measure is determined using a distance function applied to each candidate embedding and the embedding of the seed keyword in the embedding space; and decoding the one or more candidate embeddings into one or more candidate keywords;

score each of the plurality of candidate keywords based, at least in part, on an engagement metric measuring user engagement with the content item in response to being presented with results from a search query comprising the candidate keyword, wherein the results are returned by a search engine in response to the search query and are different from the content item;

select a candidate keyword from the plurality of candidate keywords based on the scoring; and provide a suggestion to the content provider that the selected candidate keyword be included as a search keyword for the content item;

store the suggested selected candidate keyword in a structured index for retrieval in response to future search queries;

receive a new search query from a user, the new search query including one or more keywords;

in response to determining that the new search query contains the suggested selected candidate keyword, identify the content item associated with the suggested selected candidate keyword from the structured index;

retrieve the content item from the database of content items;

provide the retrieved content item with results of the new search query for display to the user;

measure user engagement of the user with the retrieved content item in response to being presented with the results of the new search query; and update a score of the suggested selected candidate keyword based on the user engagement with the retrieved content item.

13. The computer program product of claim 12, wherein the instructions, when executed by the processor, further cause the processor to:

receive a selection from the content provider to use the suggested selected candidate keyword to define an audience for a recommendation about the content item;

receive a search query from a user of a client device, wherein the received search query includes the suggested selected candidate keyword;

responsive to receiving the search query that includes the suggested selected candidate keyword, include the recommendation about the content item in a set of recommendations or search results responsive to the received search query; and send the set of recommendations or the search results for display to the user.

14. The computer program product of claim 12, wherein scoring each of the plurality of candidate keywords based, further in part, on a similarity of the candidate keyword to a seed keyword for the set of seed keywords.

15. The computer program product of claim 12, wherein generating the set of seed keywords related to the content item comprises receiving an input from the content provider, indicating the set of seed keywords.

16. The computer program product of claim 12, wherein generating the set of seed keywords related to the content item comprises parsing a title of the content item or a description of a subject associated with the content item to identify the set of seed keywords.

17. The computer program product of claim 16, wherein parsing the title of the content item or the description of the subject associated with the content item comprises:

for each word in the title of the content item or the description of the subject associated with the content item, computing a term9frequency-inverse document frequency (TF-IDF); and selecting the set of seed keywords based on the computed TF-IDFs thereof.

18. The computer program product of claim 12, wherein generating the set of seed keywords related to the content item comprises:

accessing a database of an item embedding space;

converting the content item into an item embedding in the item embedding space;

identifying one or more candidate item embeddings that are similar or adjacent to the item embedding;

identifying one or more candidate content items corresponding to the one or more candidate item embeddings; and selecting the set of seed keywords based on titles of the one or more candidate content items or descriptions of subjects associated with the one or more candidate content items.

19. A system comprising:

a processor; and a non-transitory computer readable storage medium having instructions encoded thereon that, when executed by the processor, cause the processor to:

receive, from a content provider, information about an item in a database of content items;

generate a set of seed keywords related to the content item;

generate a plurality of candidate keywords based on the set of seed keywords by, comprising:

for each of the set of seed keyword:

converting the seed keyword to an embedding using a trained query embedding model, the trained query embedding model being a machine learning model trained on historical query-result pairs to learn an embedding space, in which keywords that, when submitted as search queries, result in similar search results that have embeddings that are close to each other, each embedding being a vector representation of a keyword in search queries in the embedding space;

identifying one or more candidate embeddings from the embedding space based on computed proximity measures between each candidate embedding and the embedding for the seed keyword, wherein each proximity measure is determined using a distance function applied to each candidate embedding and the embedding of the seed keyword in the embedding space; and decoding the one or more candidate embeddings into one or more candidate keywords;

score each of the plurality of candidate keywords based, at least in part, on an engagement metric measuring user engagement with the content item in response to being presented with results from a search query comprising the candidate keyword, wherein the results are returned by a search engine in response to the search query and are different from the content item;
select a candidate keyword from the plurality of candidate keywords based on the scoring; and
provide a suggestion to the content provider that the selected candidate keyword be included as a search keyword for the content item;
store the suggested selected candidate keyword in a structured index for retrieval in response to future search queries;
receive a new search query from a user, the new search query including one or more keywords;
in response to determining that the new search query contains the suggested selected candidate keyword, identify the content item associated with the suggested selected candidate keyword from the structured index;
retrieve the content item from the database of content items;
provide the retrieved content item with results of the new search query for display to the user;
measure user engagement of the user with the retrieved content item in response to being presented with the results of the new search query; and
update a score of the suggested selected candidate keyword based on the user engagement with the retrieved content item.

20. The system of claim 19, wherein the instructions, when executed by the processor, further cause the processor to:
receive a selection from the content provider to use the suggested selected candidate keyword to define an audience for a recommendation about the content item;
receive a search query from a user of a client device, wherein the received search query includes the suggested selected candidate keyword;
responsive to receiving the search query that includes the suggested selected candidate keyword, include the recommendation about the content item in a set of recommendations or search results responsive to the received search query; and
send the set of recommendations or the search results for display to the user.

\* \* \* \* \*